United States Patent [19]
Gibbons

[11] Patent Number: 5,413,366
[45] Date of Patent: May 9, 1995

[54] VERTICALLY ADJUSTABLE TRAILER HITCH

[76] Inventor: Eldon L. Gibbons, 1002 Marilyn, Springdale, Ark. 72764

[21] Appl. No.: 72,487

[22] Filed: Jun. 7, 1993

[51] Int. Cl.$^6$ .............................................. B60D 1/06
[52] U.S. Cl. ................................. 280/490.1; 280/504
[58] Field of Search ................... 280/490.1, 477, 478.1, 280/497, 507, 515, 504

[56] References Cited

U.S. PATENT DOCUMENTS

| | | | |
|---|---|---|---|
| 2,847,232 | 8/1958 | Graham | 280/490.1 |
| 3,655,221 | 4/1972 | Warner | 280/490.1 |
| 3,922,006 | 11/1975 | Borges | 280/490.1 |
| 4,078,823 | 3/1978 | McBride | 280/490.1 |
| 4,103,928 | 8/1978 | Sheppard, Jr. | 280/490.1 |
| 4,148,498 | 4/1979 | Taylor, Jr. | 280/490.1 X |
| 4,157,189 | 6/1979 | Poley | 280/490.1 |
| 4,215,876 | 8/1980 | Jacks | 280/483 |
| 4,266,799 | 5/1981 | Wood | 280/490.1 |
| 4,662,647 | 5/1987 | Calvert | 280/490.1 |

FOREIGN PATENT DOCUMENTS

| | | | |
|---|---|---|---|
| 0179422 | 4/1986 | European Pat. Off. | 280/490.1 |
| 3122116 | 12/1982 | Germany | 280/490.1 |
| 4012586 | 6/1991 | Germany | 280/490.1 |

OTHER PUBLICATIONS

Redneck Trailer Supplies–catalog.

Primary Examiner—Margaret A. Focarino
Assistant Examiner—Victor E. Johnson
Attorney, Agent, or Firm—Boyd D. Cox

[57] ABSTRACT

A vertically adjustable trailer hitch includes a stationary portion possessing a transversely extending mounting stub dimensioned for insertion into a trailer hitch tongue. A plurality of reinforcement struts include mounting edges disposed in spaced relation to the mounting stub and adapted for welding to the trailer hitch tongue. A vertically elongated rectangular guide plate includes a plurality of pairs of aligned apertures spaced along opposite longitudinal edge portions. A longitudinally extending guide rib extends vertically along a front face of the guide plate. A stop block secured on a top edge of the guide plate overhangs the guide rib. A vertically reciprocal slider includes opposite channel edge portions surrounding longitudinal edge portions of the guide plate. A guide groove on the slider is disposed in engagement with the guide rib. A pair of latch pin assemblies on the slider are selectively engageable with the apertures of the guide plate to secure the slider in a selected vertically adjusted position. A trailer hitch coupler mount extends outwardly from a front face of the slider.

22 Claims, 3 Drawing Sheets

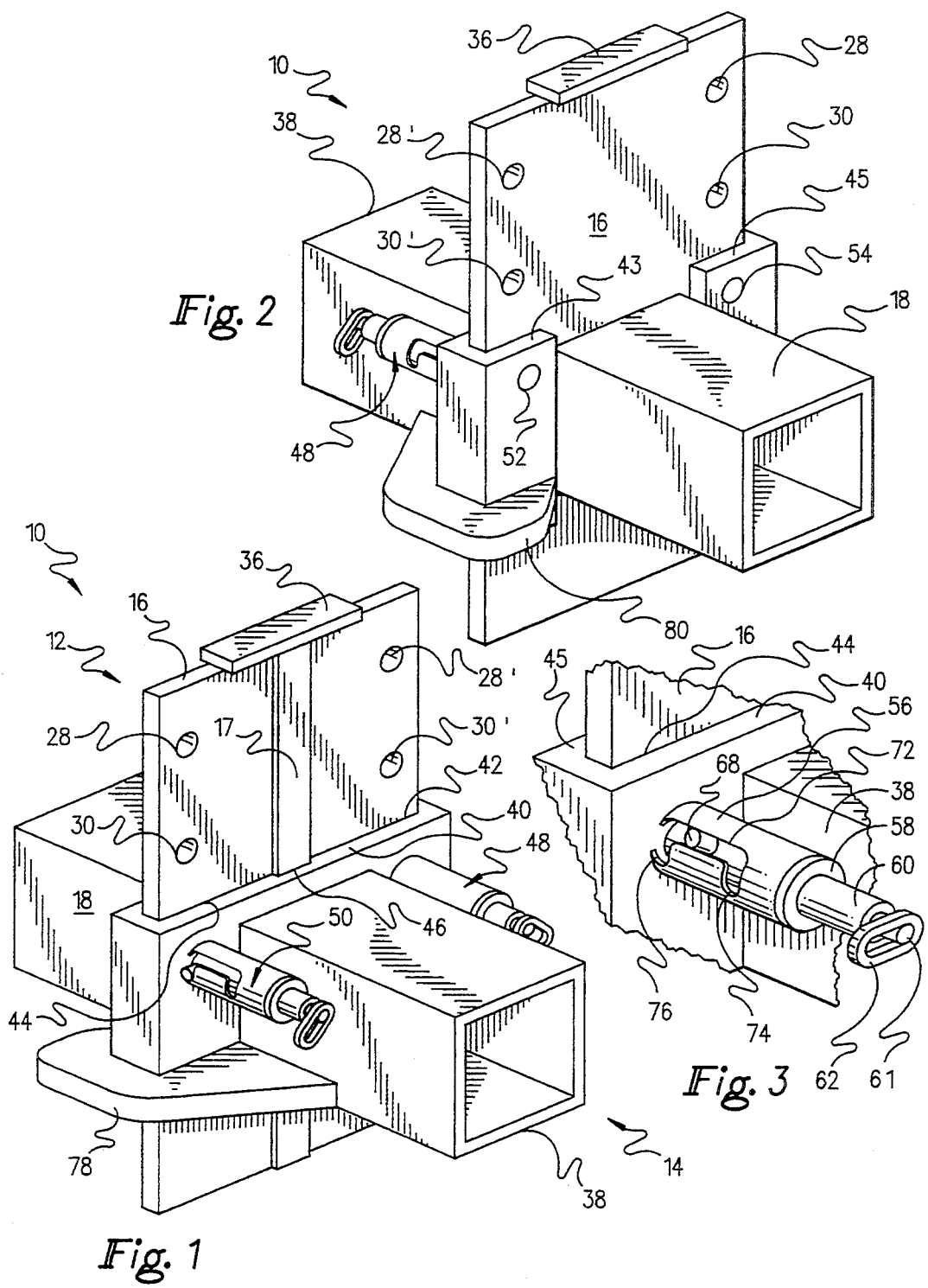

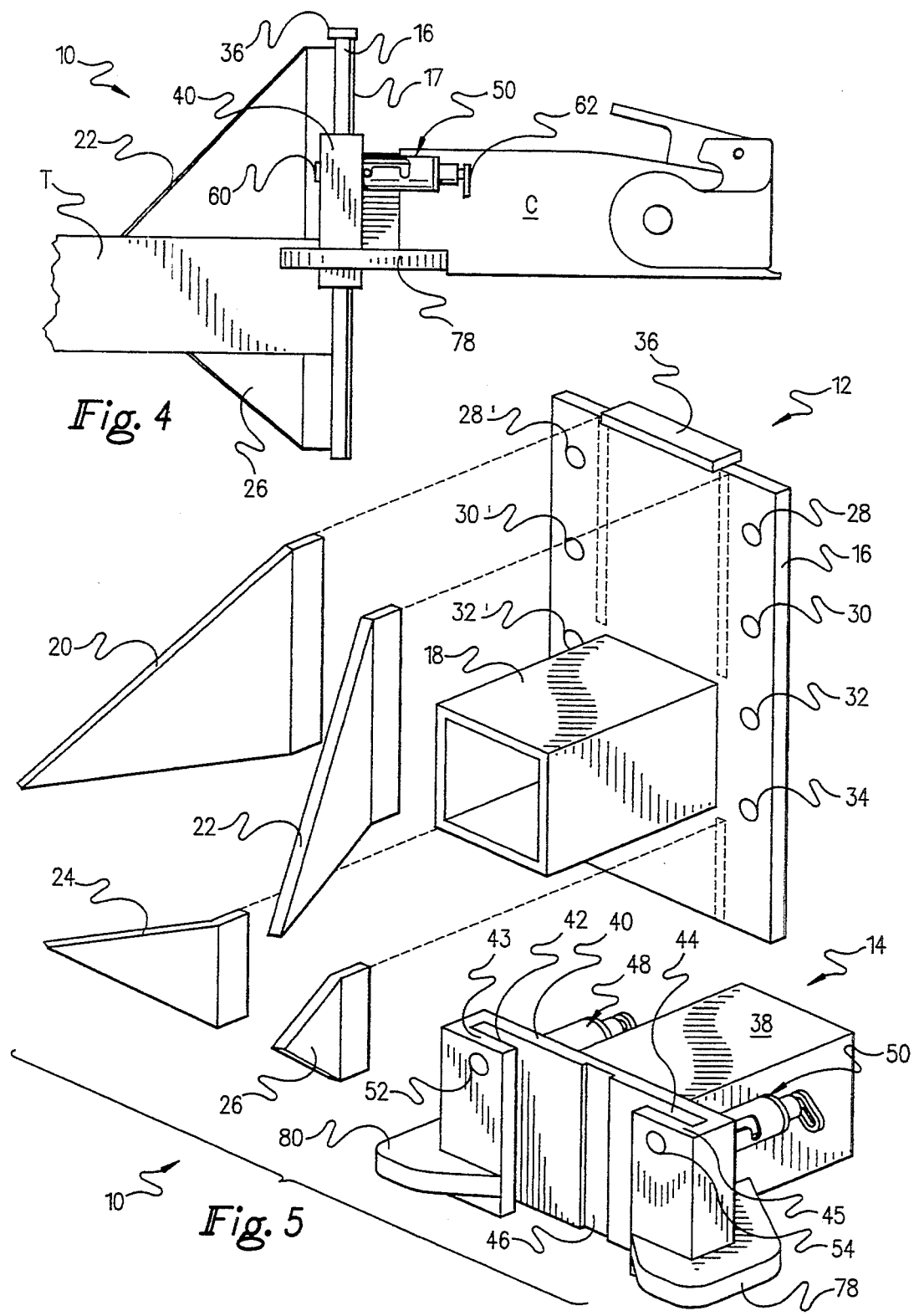

VERTICALLY ADJUSTABLE TRAILER HITCH

BACKGROUND OF THE INVENTION

1. Background Of The Invention

The present invention relates to trailer hitches, and more particularly pertains to an improved vertically adjustable trailer hitch. A wide variety of trailers such as camper trailers, boat trailers, horse trailers, etc., possess forwardly extending tongues adapted for connection through a variety of conventional hitch coupler mechanisms to a rearward end of a towing vehicle. Due to variances in height of the rear bumper or other trailer hitch mounting surfaces of the wide variety of motor vehicles in use, there is frequently a vertical mis-alignment of the trailer hitch coupler on the towing vehicle with the corresponding hitch coupler portion on the trailer tongue, resulting in the inability to tow the vehicle at all, or the inability to tow the trailer in a substantially level orientation.

2. Description Of The Prior Art

In order to overcome these problems, the prior art provides a variety of drop hitches or hitch adaptors connectable to the trailer hitch mount on the towing vehicle in order to adjust the vertical height of the coupling point with respect to the trailer tongue. Such drop-type hitches are available with a plurality of different vertical extents, and are typically not adjustable without removal and replacement with a different hitch adaptor. The prior art type drop hitches are thus disadvantageous due to the necessity of purchasing a plurality of relatively expensive drop hitches and also due to the fact that the range of adjustment is limited by the availability of adaptors in predetermined fixed lengths. Finally, the particular drop hitch required is not always readily available when coupling a new or different trailer to a new or different towing vehicle.

SUMMARY OF THE INVENTION

Accordingly, it is an object of the present invention to provide a new and improved vertically adjustable trailer hitch which includes a stationary portion possessing a transversely extending mounting stub dimensioned for insertion into a trailer hitch tongue. A plurality of reinforcement struts include mounting edges disposed in slightly spaced relation to the mounting stub and adapted for welding to the trailer hitch tongue. A vertically elongated rectangular guide plate includes a plurality of pairs of aligned apertures spaced along opposite longitudinal edge portions. A longitudinally extending guide rib extends vertically along a front face of the guide plate. A stop block secured on a top edge of the guide plate overhangs the guide rib. A vertically reciprocal slider includes opposite channel edge portions surrounding longitudinal edge portions of the guide plate. A guide groove on the slider is disposed in engagement with the guide rib. A pair of latch pin assemblies on the slider are selectively engageable with the apertures of the guide plate to secure the slider in a selected vertically adjusted position. A trailer hitch coupler mount extends outwardly from a front face of the slider.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

FIG. 1 is a front side perspective view illustrating the vertically adjustable trailer hitch according to the present invention.

FIG. 2 is a rear side perspective view illustrating the vertically adjustable trailer hitch according to the present invention.

FIG. 3 is a perspective detail view illustrating a latch pin assembly of the vertically adjustable trailer hitch of the present invention.

FIG. 4 is a side elevational view illustrating the vertically adjustable trailer hitch of the present invention mounted on a trailer tongue.

FIG. 5 is an exploded perspective view illustrating the components of the vertically adjustable trailer hitch of the present invention.

DETAILED DESCRIPTION OF THE PREFERRED EMBODIMENT(S)

Figure 6:
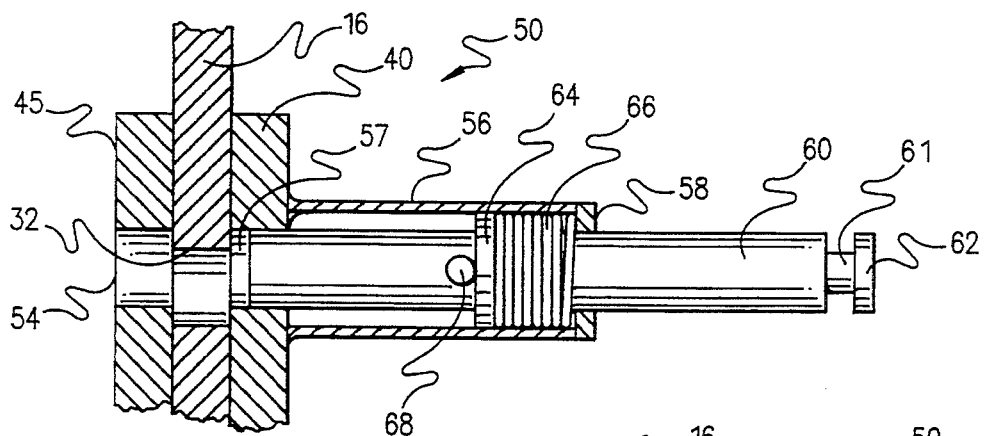
FIG. 6 is a longitudinal cross-sectional detail view illustrating a latch pin assembly of the vertically adjustable trailer hitch of the present invention in an unlatched condition.

Referring now to the drawings, wherein like reference numerals designate corresponding structure throughout the views, and referring in particular to FIGS. 1, 2, and 5, a vertically adjustable trailer hitch 10 according to the invention includes a fixed guide portion 12 adapted for securement to a trailer hitch tongue and a vertically slidable component 14 mounted for vertical adjustment thereon. The fixed guide component 12 includes a vertically elongated rectangular guide plate 16 possessing a front surface provided with a substantially centrally disposed vertically extending upstanding rectangular guide rib 17. A hollow rectangular trailer tongue stub mount 18 extends transversely from a rear face of the guide plate 12 and is dimensioned for insertion into a hollow end portion of a conventional trailer hitch tongue. Alternatively, the guide plate 16 may be welded or otherwise secured directly to the front face of the trailer hitch tongue.

With reference to FIGS. 4 and 5, a plurality of substantially triangular reinforcement struts 20, 22, 24, and 26 are welded or otherwise secured to the rear face of the guide plate 16 such that mounting edge portions extend in spaced substantially parallel relation with top and bottom surfaces of the mounting stub 18. Accordingly, upon insertion of the mounting stub 18 into a trailer hitch tongue T, as depicted in FIG. 4, the free bottom mounting edges of the reinforcement struts, for example struts 22 and 26, are disposed in closely adjacent or abutting relation with the top and bottom surfaces, respectively, of the trailer hitch tongue T. During this phase of assembly, the mounting edges are preferably welded to the trailer hitch tongue T to substantially permanently secure the guide plate 16 in fixed relation on a front face of the trailer tongue T. A plurality of vertically spaced pairs of aligned detent apertures 28, 28', 30, 30', 32, 32', and 34, 34' are disposed in respective opposite longitudinal edge portions of the guide plate 16 for the purpose of defining a plurality of discreet vertically adjusted positions. A stop block 36 welded or otherwise secured to a top edge portion of the guide plate 16 at least partially overhangs the guide rib 17 for the purpose of limiting vertical upward movement of the slidable component 14.

With reference to FIGS. 1, 2, and 5, the slidable component 14 includes a coupler stub mount 38 transversely extending from a front face of a slider 40. The coupler stub mount 38 is adapted for attachment to a conventional trailer hitch coupler member such as the ATWOOD (trademark) hitch ball coupler C illustrated in FIG. 4. A variety of other conventional trailer hitch coupler members may also be employed in conjunction with the vertically adjustable trailer hitch 10 of the present invention. The slider 40 includes opposite longitudinal channel edge portions defining respective slots 42 and 44 dimensioned for surrounding the longitudinal edge portions of the guide plate 16. The channel portions of slider 40 include respective overlying rails 43 and 45 possessing circular apertures 52 and 54 dimensioned and disposed for selective alignment with the respective detent aperture pairs of guide plate 16. A vertically extending centrally disposed elongated rectangular guide groove 46 in slider 40 is dimensioned for free sliding engagement with the guide rib 17 on the front face of guide plate 16. Accordingly, it may now be readily appreciated that the slidable component 14 is disposed for selective vertical slidable adjustment on guide plate 16 in the assembled configuration of the hitch 10. In an alternative construction contemplated within the scope of the invention, the guide rib may be provided on the slidable component 14 and the guide groove 46 formed in the guide plate 16. Also, it should be noted that the guide rib 17 and guide groove 46 may be omitted to provide for a simpler construction of the invention.

Figure 7:
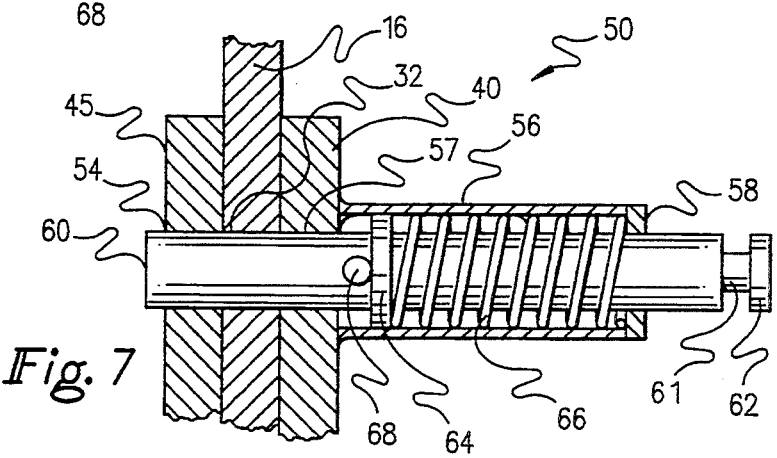
FIG. 7 is a longitudinal cross-sectional detail view illustrating a latch pin assembly of the vertically adjustable trailer hitch of the present invention in a latched condition.
Figure 8:
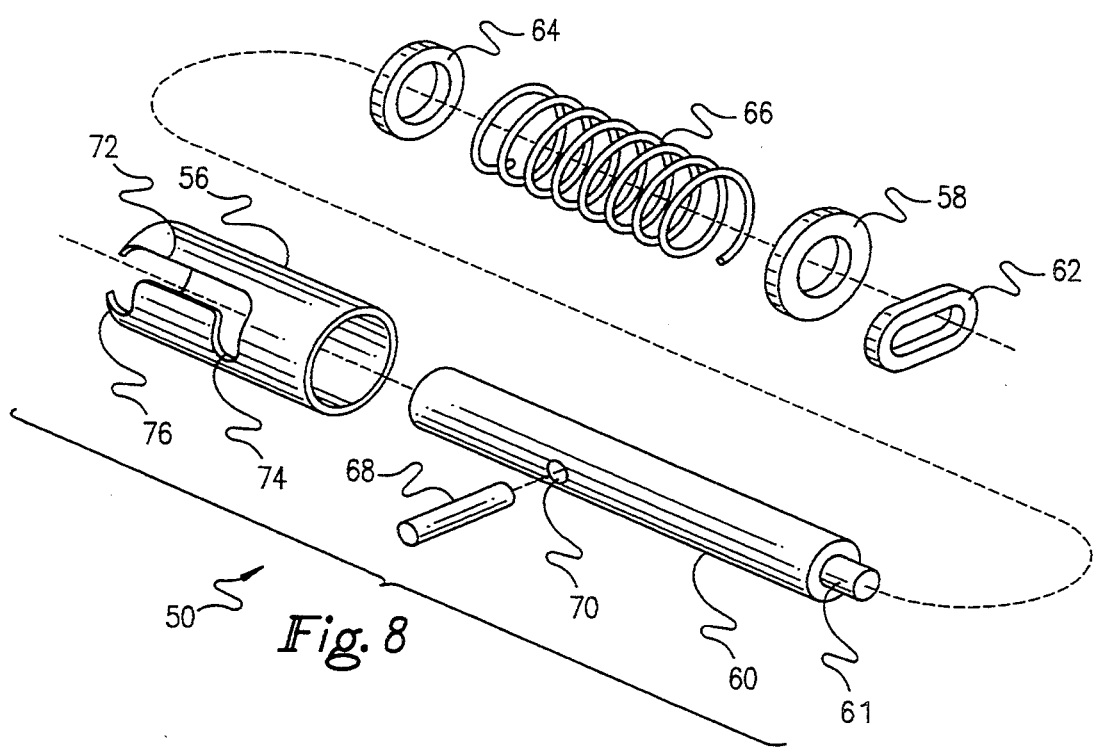
FIG. 8 is an exploded perspective view illustrating the components of a latch pin assembly of the vertically adjustable trailer hitch of the present invention.

In order to releasably secure the slidable component 14 in a selected adjusted position, a pair of latch pin assemblies 48 and 50 are welded or otherwise secured to a front face of slider 40. With reference to FIGS. 6, 7, and 8, each of the latch assemblies 48 and 50, for example the illustrated latch assembly 50, include a cylindrical barrel 56 welded to the front face of slider 40 in coaxial alignment with a circular aperture 57 formed therethrough. Thus, barrel 56, aperture 57, and aperture 54 in rail 45 are disposed in fixed coaxial alignment. An outer end cap 58 of barrel 56 is welded or otherwise secured in place and may take the form of a conventional washer. A high strength steel latch pin 60 is dimensioned for reciprocal axial sliding movement within barrel 56 and includes an inner end portion dimensioned for selective engagement through aperture 57 and 54 and slider 40 and also through one of the plurality of detent apertures, for example aperture 32, in guide plate 16. An outer end of guide pin 60 terminates in a reduced neck or stem portion 61 secured in a radially offset manner to a laterally elongated knob 62. The laterally or radially offset orientation of knob 62 facilitates manual rotation of pin 60. An integral flange or separable washer 64 surrounds pin 60 and includes an inner face disposed in abutment with a transversely extending roll pin 68 or the like extending in press-fit relation through transverse aperture 70 in pin 60. A coil compression spring 66 surrounds latch pin 60 and is captured between washer 64 and end cap 58, such that latch pin 60 is biased inwardly into engagement with the aligned apertures 57, 32, and 54, as illustrated in FIG. 7.

With reference to FIGS. 3 and 8, the barrel 56 of latch pin assembly 50 includes an axially extending slot 72 provided with outer 74 and inner 76 circumferentially offset detent portions for engagement with roll pin 68 in unlatched and latched positions, respectively. Accordingly, manual manipulation of latch pin 60 in axial and rotational directions, effected through use of knob 62, allows the latch pin 60 to be locked selectively in an extended latched position or a retracted unlatched position. As may now be readily appreciated with reference to FIG. 1, conjoint manipulation of latch pin assemblies 48 and 50 allows slider 40 to be disposed in one of a plurality of different selected vertically adjusted positions along guide plate 16 for facilitating towing of a variety of different trailers in level orientations. Also, the slidable component 14 with attached trailer hitch coupler can be slid vertically downward for removal from fixed guide component 12 and stored in a secure place when not in use, thereby deterring unwanted use or theft of the trailer since the coupler is not accessible, only the guide plate 16, for attachment to a vehicle.

In order to enhance the strength of the slider component 14, a pair of reinforcement gussets 78 and 80 are welded or otherwise secured to the channel edge portions of slider 40 and opposite side portions of mounting stub 38. While the components of the vertically adjustable trailer hitch 10 of the present invention are preferably formed by welding from a suitable high strength metal material, a variety of other assembly techniques such as rivets, bolts, adhesives, etc. may also be employed without departing from the scope of the present invention.

Additionally, the guide plate 16 may be mounted on the towing vehicle, instead of upon the trailer. In this alternative embodiment of the present invention, the slidable component 14 would be secured to the trailer, instead of the towing vehicle.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A vertically adjustable trailer hitch for use in coupling a trailer to a towing vehicle, comprising:

a guide component;

means for securing said guide component to one of said trailer and said towing vehicle;

a slidable component mounted on said guide component for vertical reciprocal movement to a plurality of adjusted positions;

means for securing said slidable component to the other of said trailer and said towing vehicle;

means the retaining said slidable component in a selected adjusted position comprising a latch pin assembly including a latch pin and detent means for selectively retaining said latch pin in engaged and disengaged positions, said detent means comprising:

a barrel at least partially receiving said latch pin for sliding movement therein;

a longitudinally extending slot formed in a sidewall portion of said barrel;

said slot including two spaced circumferentially offset portions corresponding to said engaged and disengaged positions of said latch pin; and a detent member extending transversely from said latch pin disposed in engagement with said slot and selectively engageable with said circumferentially offset portions.

2. The trailer hitch of claim 1, further comprising a plurality of vertically spaced apertures in said guide plate dimensioned for engagement with said latch pin for defining a plurality of spaced, discrete vertically adjusted positions of said slidable component.

3. The trailer hitch of claim 1, further comprising a guide rib on one of said guide component and said slidable component disposed in sliding engagement in a guide groove on the other of said guide component and said slidable component.

4. The trailer hitch of claim 1, wherein said means for securing said slidable component comprises a transversely extending mounting stub.

5. The trailer hitch of claim 4, wherein said mounting stub comprises a tubular member possessing a quadrilateral transverse cross sectional shape.

6. The trailer hitch of claim 1, wherein said means for securing said guide component comprises a transversely extending mounting stub.

7. The trailer hitch of claim 6, wherein said mounting stub comprises a tubular member possessing a quadrilateral transverse cross sectional shape.

8. The trailer hitch of claim 6, further comprising a plurality of reinforcement struts each possessing mounting surfaces disposed in spaced substantially parallel relation to an outer surface portion of said mounting stub.

9. The trailer hitch of claim 1, wherein said slidable component includes opposite channel edge portions substantially surrounding opposite vertically extending longitudinal edge portions of said guide component.

10. The trailer hitch of claim 9, wherein at least one of said channel edge portions includes two spaced substantially parallel walls disposed on opposite sides of one of said guide component longitudinal edge portions;

aligned apertures formed in said two substantially parallel walls;

a plurality of vertically spaced apertures formed through said one of said guide component longitudinal edge portions; and said latch pin selectively insertable through said aligned apertures in said two substantially parallel walls and through one of said vertically spaced apertures to retain said slidable component in a selected adjusted position.

11. The trailer hitch of claim 1, wherein said latch pin assembly includes a spring biasing said latch pin toward an engaged position.

12. A vertically adjustable trailer hitch comprising:

a fixed rectangular guide plate including a plurality of pairs of aligned apertures spaced vertically along opposite longitudinal edge portions;

a substantially centrally disposed longitudinally extending guide rib on a front face of said guide plate;

a stop block secured to an upper edge of said guide plate and at least partially overhanging said guide rib;

a mounting stub extending from a back face of said guide plate dimensioned for insertion into a trailer tongue;

a plurality of substantially triangular reinforcement struts extending from said back face of said guide plate, each of said reinforcement struts possessing a mounting edge slightly spaced from said mounting stub such that upon insertion of said mounting stub into a trailer tongue, said mounting edges of said struts are disposed closely adjacent to outer surfaces of the trailer tongue;

a slider disposed for vertical reciprocal adjustment on said guide plate, said slider possessing opposite channel portions substantially enclosing longitudinal edge portions of said guide plate;

a guide groove in said slider disposed in engagement with said guide rib on said guide plate;

said slider possessing a top edge surface disposed for abutment with said stop block for limiting vertical upward movement of said slider;

a coupler stub mount extending from a front face of said slider for connecting with a trailer hitch coupler;

a pair of reinforcement gussets securing opposite side portions of said coupler stub mount to said slider;

a pair of latch pin assemblies secured to a front face of each of said channel portions of said slider for selective engagement with one of said pairs of aligned apertures in said guide plate for securing said slider in one of a plurality of different vertically adjusted positions, each of said latch pin assemblies including:

a barrel secured to a front face of said channel portion of said slider;

a latch pin received for reciprocal sliding movement in said barrel and possessing an inner end portion movable into and out of engagement with aligned apertures in said channel portions and said guide plate apertures;

a roll pin extending through a transverse aperture in said latch pin;

a washer disposed on said latch in on an outer side of said roll pin;

a coil compression spring surrounding said latch pin and having an inner end disposed in abutment with said washer;

an outer end of said latch pin extending through an end cap on said barrel;

said spring having an outer end face in abutment with an inner face of said end cap such that said latch pin is biased inwardly into engagement with said aligned apertures;

said sleeve including a longitudinally extending slot possessing axially spaced circumferentially extending off set portions for engagement with said roll pin in latched and unlatched positions; and a radially off set knob on an exposed outer end of said latch pin for facilitating manual rotation and axial movement of said latch pin whereby said slider may be vertically adjusted with respect to said guide plate without the use of any tools.

13. A vertically adjustable trailer hitch for use in coupling a trailer to a towing vehicle, comprising:

a guide component;

means the securing said guide component to one of said trailer and said towing vehicle;

a slidable component mounted on said guide component for vertical reciprocal movement to a plurality of adjusted positions, said slidable component including two opposite channel edge portions substantially surrounding opposite vertically extending longitudinal edge portions of said guide component;

at least one of said channel edge portions including two spaced substantially parallel walls disposed on opposite sides of one of said guide component longitudinal edge portions;

aligned apertures formed in said two substantially parallel walls;

a plurality of vertically spaced apertures formed through said one of said guide component longitudinal edge portions;

a latch pin selectively insertable through said aligned apertures in said two substantially parallel walls and through one of said vertically spaced apertures to retain said slidable component in a selected adjusted position;

means for securing said slidable component to the other of said trailer and said towing vehicle;

a latch pin assembly including a spring biasing said latch pin toward an engaged position and detent means for selectively retaining said latch pin in engaged and disengaged positions, said detent means comprising:

a barrel at least partially receiving said latch pin for sliding movement therein;

a longitudinally extending slot formed in a sidewall portion of said barrel;

said slot including two spaced circumferentially offset portions corresponding to said engaged and disengaged positions of said latch pin; and a detent member extending transversely from said latch pin disposed in engagement with said slot and selectively engageable with said circumferentially offset portions.

14. A vertically adjustable trailer hitch for use in coupling a trailer to a towing vehicle, comprising:

a guide component;

means for securing said guide component to one of said trailer and said towing vehicle;

a slidable component mounted on said guide component for vertical reciprocal movement to a plurality of adjusted positions;

means for securing said slidable component to the other of said trailer and said towing vehicle;

a substantially centrally disposed vertically extending guide rib on one of said guide component and said slidable component disposed in sliding engagement in a substantially centrally disposed vertically extending guide groove on the other of said guide component and said slidable component;

said slidable component including opposite substantially vertically extending channel edge portions substantially surrounding opposite substantially vertically extending outer longitudinal edge portions of said guide component;

each of said channel edge portions including two spaced substantially parallel walls disposed on opposite sides of one of said guide component outer longitudinal edge portions;

said engaged guide rib and guide groove disposed substantially centrally between said channel edge portions;

aligned apertures formed in said two substantially parallel walls;

a plurality of vertically spaced apertures formed through said one of said guide component longitudinal edge portions; and a latch pin selectively insertable through said aligned apertures in said two substantially parallel walls and through one of said vertically spaced apertures to retain said slidable component in a selected adjusted position.

15. The trailer hitch of claim 14, wherein said means for securing said slidable component comprises a transversely extending mounting stub.

16. The trailer hitch of claim 15, wherein said mounting stub comprises a tubular member possessing a quadrilateral transverse cross sectional shape.

17. The trailer hitch of claim 14, wherein said means for securing said guide component comprises a transversely extending mounting stub.

18. The trailer hitch of claim 17, wherein said mounting stub comprises a tubular member possessing a quadrilateral transverse cross sectional shape.

19. The trailer hitch of claim 17, further comprising a plurality of reinforcement struts each possessing mounting surfaces disposed in spaced substantially parallel relation to an outer surface portion of said mounting stub.

20. The trailer hitch of claim 14, further comprising a spring biasing said latch pin toward an engaged position.

21. The trailer hitch of claim 14, further comprising detent means for selectively retaining said latch pin in engaged and disengaged positions.

22. The trailer hitch of claim 21, wherein said detent means comprises:

a barrel at least partially receiving said latch pin for sliding movement therein;

a longitudinally extending slot formed in a sidewall portion of said barrel;

said slot including two spaced circumferentially offset portions corresponding to said engaged and disengaged positions of said latch pin; and a detent member extending transversely from said latch pin disposed in engagement with said slot and selectively engageable with said circumferentially offset portions.

* * * * *

UNITED STATES PATENT AND TRADEMARK OFFICE
CERTIFICATE OF CORRECTION

PATENT NO. : 5,413,366
DATED : May 9, 1995
INVENTOR(S) : Eldon L. Gibbons

It is certified that error appears in the above-identified patent and that said Letters Patent is hereby corrected as shown below:

In Claim 1, column 4, line 65 of the Patent, delete "the" before "retaining" and substitute -for- therefor.

Signed and Sealed this

Twelfth Day of September, 1995

Attest:

BRUCE LEHMAN

Attesting Officer   Commissioner of Patents and Trademarks